US011063795B2

(12) United States Patent
Cavalcante et al.

(10) Patent No.: US 11,063,795 B2
(45) Date of Patent: Jul. 13, 2021

(54) METHODS AND DEVICES FOR ADAPTING LOAD ON A FRONTHAUL NETWORK

(71) Applicant: TELEFONAKTIEBOLAGET LM ERICSSON (PUBL), Stockholm (SE)

(72) Inventors: André Mendes Cavalcante, Indaiatuba (BR); Igor Almeida, Indaiatuba (BR); Eduardo Lins de Medeiros, Sundbyberg (SE); Miguel Berg, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 13 days.

(21) Appl. No.: 16/461,264

(22) PCT Filed: Nov. 16, 2016

(86) PCT No.: PCT/SE2016/051127
§ 371 (c)(1),
(2) Date: May 15, 2019

(87) PCT Pub. No.: WO2018/093301
PCT Pub. Date: May 24, 2018

(65) Prior Publication Data
US 2019/0273641 A1    Sep. 5, 2019

(51) Int. Cl.
*H04L 27/00* (2006.01)
*H04L 5/00* (2006.01)
(Continued)

(52) U.S. Cl.
CPC ........ *H04L 27/0008* (2013.01); *H04L 5/0046* (2013.01); *H04L 25/0202* (2013.01); *H04L 43/026* (2013.01); *H04W 72/085* (2013.01)

(58) Field of Classification Search
CPC . H04W 80/04; H04W 36/18; H04W 36/0011; H04W 36/14; H04W 36/08
(Continued)

(56) References Cited

U.S. PATENT DOCUMENTS 6,618,397 B1 *   9/2003   Huang ................... H04L 29/06
                                                     370/392
7,649,861 B2 *   1/2010   Maltsev ................ H04L 1/0026
                                                     370/328
(Continued)

FOREIGN PATENT DOCUMENTS

CN      102291855 A    12/2011
CN      102299735 A    12/2011
(Continued)

OTHER PUBLICATIONS

China Mobile Research Institute, "C-RAN: The road towards green RAN," China Mobile White Paper, v2, 2011.
(Continued)

*Primary Examiner* — Peter G Solinsky
*Assistant Examiner* — Sanjay K Dewan

(57) ABSTRACT

A method performed in a scheduler entity is provided for adapting load on a fronthaul network in a radio access network comprising a central baseband unit and a remote radio unit. The central baseband unit and the remote radio unit are interconnected by the fronthaul network over which baseband signal information is exchanged. The method comprises obtaining information related to capacity of the fronthaul network, and adapting, based on the obtained information, air interface performance for at least one type of conveyed baseband signal information such as to enable adapting of load on the fronthaul network. A scheduler entity, method in a fronthaul module, computer programs and computer program products are also provided.

19 Claims, 7 Drawing Sheets

(51) Int. Cl.
*H04L 25/02* (2006.01)
*H04L 12/26* (2006.01)
*H04W 72/08* (2009.01)

(58) Field of Classification Search
USPC .......................................................... 370/331
See application file for complete search history.

(56) References Cited

U.S. PATENT DOCUMENTS

| | | | |
|---|---|---|---|
| 8,644,368 | B1 | 2/2014 | Zhang et al. |
| 8,923,386 | B2 | 12/2014 | Samardzija et al. |
| 10,171,150 | B1 | 1/2019 | Marupaduga |
| 10,334,478 | B2 * | 6/2019 | Boldi ................ H04W 72/1289 |
| 2005/0105552 | A1 | 5/2005 | Osterling |
| 2005/0107124 | A1 | 5/2005 | Osterling |
| 2007/0072646 | A1 | 3/2007 | Kuwahara et al. |
| 2009/0040918 | A1* | 2/2009 | Jiang ........................ H04B 1/59 |
| | | | 370/210 |
| 2009/0154588 | A1* | 6/2009 | Chen ..................... H04L 1/0026 |
| | | | 375/267 |
| 2010/0020702 | A1 | 1/2010 | Wong |
| 2010/0034093 | A1* | 2/2010 | Roh ..................... H04B 7/0417 |
| | | | 370/241 |
| 2010/0074121 | A1 | 3/2010 | Sakama |
| 2010/0075678 | A1 | 3/2010 | Akman et al. |
| 2010/0136932 | A1 | 3/2010 | Österling et al. |
| 2010/0273498 | A1 | 10/2010 | Kim et al. |
| 2010/0284495 | A1 | 11/2010 | Segal |
| 2011/0032910 | A1 | 2/2011 | Aarflot et al. |
| 2011/0105172 | A1 | 5/2011 | Guo |
| 2011/0274188 | A1* | 11/2011 | Sayana ................ H04B 7/0639 |
| | | | 375/260 |
| 2012/0051257 | A1* | 3/2012 | Kim ..................... H04B 7/0617 |
| | | | 370/252 |
| 2012/0057548 | A1 | 3/2012 | Hasegawa |
| 2012/0300710 | A1 | 11/2012 | Li et al. |
| 2013/0157660 | A1 | 6/2013 | Awad et al. |
| 2013/0294419 | A1 | 11/2013 | Heiser et al. |
| 2014/0079018 | A1* | 3/2014 | Seo ........................ H04L 5/0007 |
| | | | 370/330 |
| 2014/0119312 | A1 | 5/2014 | Doetsch et al. |
| 2014/0198684 | A1 | 7/2014 | Gravely |
| 2014/0248894 | A1* | 9/2014 | Kawasaki ............. H04W 72/10 |
| | | | 455/452.1 |
| 2015/0029965 | A1 | 1/2015 | Aminaka et al. |
| 2015/0030094 | A1 | 1/2015 | Zhang |
| 2015/0071368 | A1 | 3/2015 | Lau |
| 2015/0124688 | A1 | 5/2015 | Xu |
| 2015/0156284 | A1 | 6/2015 | Akhter |
| 2015/0222693 | A1 | 8/2015 | Tully |
| 2015/0303950 | A1 | 10/2015 | Shattil |
| 2016/0065388 | A1 | 3/2016 | Kakishima |
| 2016/0219343 | A1* | 7/2016 | Lida ................ H04N 21/64738 |
| 2017/0150497 | A1* | 5/2017 | Boldi ................. H04W 56/001 |
| 2017/0222693 | A1 | 8/2017 | Shen |
| 2017/0373890 | A1* | 12/2017 | Fertonani ................ H04L 25/02 |
| 2018/0054214 | A1 | 2/2018 | Takahashi |
| 2018/0287696 | A1* | 10/2018 | Barbieri ................ H04W 36/22 |
| 2018/0310199 | A1* | 10/2018 | Halabian ........... H04W 28/0252 |
| 2018/0317238 | A1 | 11/2018 | Roxbergh et al. |

FOREIGN PATENT DOCUMENTS

| | | | | |
|---|---|---|---|---|
| CN | 105144600 | A | 12/2015 | |
| EP | 0843494 | A2 | 5/1998 | |
| EP | 1827035 | A1 | 8/2007 | |
| EP | 2515590 | A1 | 10/2012 | |
| EP | 2515603 | A2 | 10/2012 | |
| EP | 2685755 | A1 | 1/2014 | |
| EP | 2739105 | A1 | 6/2014 | |
| EP | 2785099 | A1 | 10/2014 | |
| EP | 2911331 | A1 | 8/2015 | |
| FR | 2 911 331 | A1 * | 2/2014 | ............... H04L 1/00 |
| TW | 201304448 | A1 | 1/2013 | |
| WO | 2014076004 | A1 | 5/2014 | |
| WO | 2015172277 | A1 | 11/2015 | |
| WO | 2015197102 | A1 | 12/2015 | |
| WO | 2015197104 | A1 | 12/2015 | |
| WO | 2016039839 | A1 | 3/2016 | |
| WO | 2016195555 | A1 | 12/2016 | |
| WO | 2016195556 | A1 | 12/2016 | |
| WO | 2018093301 | A1 | 5/2018 | |

OTHER PUBLICATIONS

Samardzija et al., "Compressed transport of baseband signals in radio access networks," IEEE Transactions on Wireless Communications, vol. 11, No. 9, pp. 3216-3225, 2012.
Park et al., "Robust and efficient distributed compression for cloud radio access networks," Vehicular Technology, IEEE Transactions on, vol. 62, No. 2, pp. 692-703, 2013.
Nieman et al., "Time-Domain Compression of Complex-Baseband LTE Signals for Cloud Radio Access Networks," GlobalSIP 2013.
Maiden, "Low-loss compression of CPRI baseband data," EDN Network paper, Sep. 17, 2014.
Lorca et al., "Lossless Compression Technique for the Fronthaul of LTS/LTE-Advanced Cloud-RAN Architectures", 2013 IEEE 14th International Symposium on a World of Wireless, Mobile and Multimedia Networks(WOWMOM), IEEE, pp. 1-9, Jun. 4, 2013.
Park et al., "Large-scale Antenna Operation in Heterogeneous Cloud Radio Access Networks: A Partial Centralization Approach", IEEE Wireless Communications; vol. 22, No. 3, Jun. 1, 2015, pp. 1-9.
Sayeed et al., "Beamspace MIMO for High-Dimensional Multiuser Communication at Millimeter-Wave Frequencies", 2013 IEEE Global Communications Conference (GLOBECOM), Dec. 9, 2013, pp. 3679-3684.
Common Public Radio Interface (CPRI); Interface Specification; CPRO Specification V7.0, Oct. 9, 2015.
CPRI Specification V6.1 Common Public Radio Interface (CPRI); Interface Specification, Jul. 1, 2014.
Zte et al., High level views on beam management for NR-MIMO, 3GPP TSG RAN WG1 Meeting #88, R1-1701797, Athens, Greece, Feb. 13-17, 2017.
De La Oliva, et al., An Overview of the CPRI Specification and Its Application to C-RAN-Based LTE Scenarios, IEEE Communications Magazine, vol. 54, No. 2, pp. 152-159, Feb. 2016.

* cited by examiner

METHODS AND DEVICES FOR ADAPTING LOAD ON A FRONTHAUL NETWORK

RELATED APPLICATIONS

This application is national phase of PCT Patent Application No. PCT/SE2016/051127, filed Nov. 16, 2016, the disclosures of which is hereby incorporated herein by reference in its entirety.

TECHNICAL FIELD

The technology disclosed herein relates generally to the field of radio access networks having a centralized baseband controller and remote radio units, and in particular to a method in a scheduler entity for adapting load on a fronthaul network, scheduler entity, method in fronthaul module, fronthaul modules, computer programs and computer program products.

BACKGROUND

In cellular communication networks, e.g. Long Term Evolution (LTE)/LTE-Advanced (LTE-A), complex baseband samples are transported between a central unit (baseband processing equipment) and a remote unit (remote radio hardware). The links along which the samples are transported are referred to as fronthaul links, or fronthaul network. Common Public Radio Interface (CPRI) is widely used as fronthaul network in practice and enables flexible radio head deployments, distributed antenna systems, and advanced spatial processing such as coordinated multi-point (CoMP) operation.

As the number of remote units connected to a given central unit increases, the available transmission capacity on the fronthaul may rapidly become a bottleneck. This situation is even worsened when high data rate techniques are employed, such as Multiple-Input-Multiple-Output (MIMO) and Carrier Aggregation (CA). Therefore, substantial reduction on the fronthaul transport load is essential, for instance, for current and new CRANs.

SUMMARY

An objective of the present teachings is to address and improve various aspects for fronthaul networks. A particular objective is to enable reduced fronthaul transport load. This objective and others are achieved by the methods, devices, computer programs and computer program products according to the appended independent claims, and by the embodiments according to the dependent claims.

The objective is according to an aspect achieved by a method performed in a scheduler entity for adapting load on a fronthaul network in a radio access network comprising a central baseband unit and a remote radio unit. The central baseband unit and the remote radio unit are interconnected by the fronthaul network over which baseband signal information is exchanged. The method comprises obtaining information related to capacity of the fronthaul network, and adapting, based on the obtained information, air interface performance for at least one type of conveyed baseband signal information such as to enable adapting of load on the fronthaul network.

The method provides a number of advantages. For instance, by the method the scheduler is made aware of the fronthaul capacity and may take this into account in the scheduling decisions. By having knowledge on the fronthaul capacity, the scheduler can, for instance, decide to reduce air interface capacity (for one or more communication devices) in order to be able to decrease the fronthaul load by increasing compression. The method is a highly usable solution owing to the agnostic nature of the fronthaul-aware scheduler. The scheduler may be agnostic to compression methods, to scheduling algorithms (it may e.g. comply with algorithms such as round robin, proportional fair, etc.) and even to radio access technology (RAT), provided the RAT is based on resource leases. Further, the method can be applied for time domain and for frequency domain compression approaches, and is thereby able to support different fronthaul interfaces.

The objective is according to an aspect achieved by a computer program for a scheduler entity. The computer program comprises computer program code, which, when run on processing circuitry of the scheduler entity causes the scheduler entity to perform the method as above.

The objective is according to an aspect achieved by a computer program product comprising a computer program as above and a computer readable means on which the computer program is stored.

The objective is according to an aspect achieved by a scheduler entity for adapting load on a fronthaul network in a radio access network comprising a central baseband unit and a remote radio unit. The central baseband unit and the remote radio unit are interconnected by the fronthaul network over which baseband signal information is exchanged. The scheduler entity is configured to: obtain information related to capacity of the fronthaul network, and adapt, based on the obtained information, air interface performance for at least one type of conveyed baseband signal information such as to enable adapting of load on the fronthaul network.

The objective is according to an aspect achieved by a method performed in a first fronthaul module in a radio access network. The first fronthaul module is interconnected with a second fronthaul module by a fronthaul network (over which baseband signal information is exchanged. The method comprises receiving, from a scheduler entity, instructions to adapt compression scheme used for exchanging the baseband signal information over the fronthaul network, and adapting, the compression scheme according to the received instructions.

The objective is according to an aspect achieved by a computer program for a first fronthaul module. The computer program comprises computer program code, which, when run on processing circuitry of the first fronthaul module causes the first fronthaul module to perform the method as above.

The objective is according to an aspect achieved by a computer program product comprising a computer program as above and a computer readable means on which the computer program is stored.

The objective is according to an aspect achieved by a first fronthaul module in a radio access network. The first fronthaul module is interconnected with a second fronthaul module by a fronthaul network over which baseband signal information is exchanged. The first fronthaul module is configured to: receive, from a scheduler entity, instructions to adapt compression scheme used for exchanging the baseband signal information over the fronthaul network, and adapt, the compression scheme according to the received instructions.

Further features and advantages of the embodiments of the present teachings will become clear upon reading the following description and the accompanying drawings.

DETAILED DESCRIPTION

Figure 1:
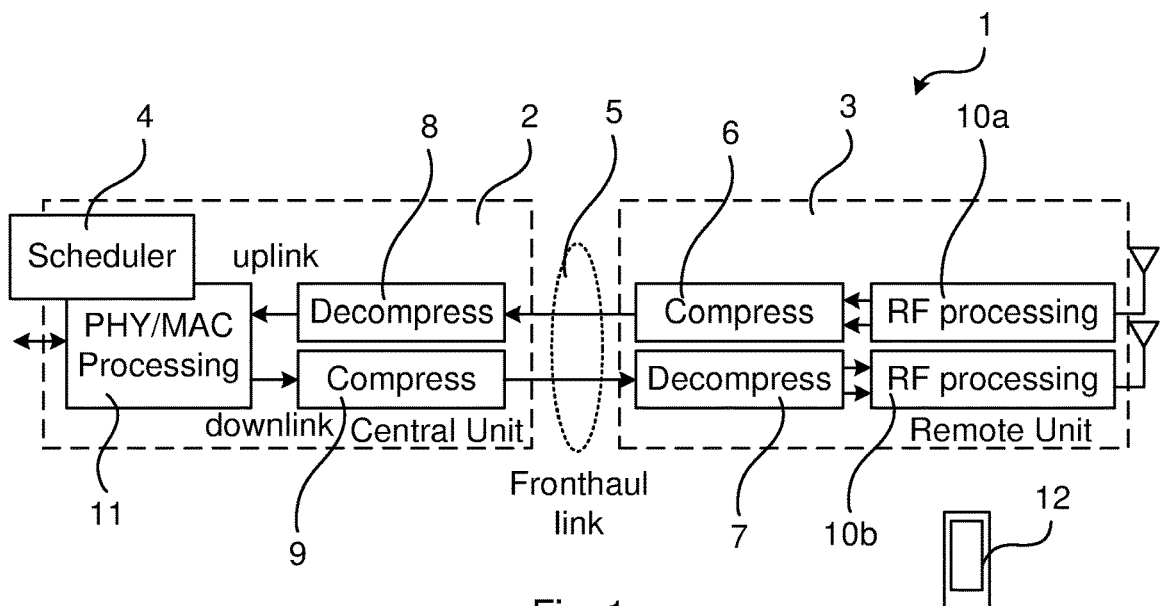
FIG. 1 illustrates schematically an environment in which embodiments according to the present teachings may be implemented.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

Briefly, the present teachings provide, in various embodiments, an efficient method for reducing fronthaul transport load with limited impact on end-to-end network communication performance. The method makes a scheduler, e.g. a Media Access Control (MAC) scheduler, aware of fronthaul capacity (in particular capacity limitations), and by means of a modified Radio Resource Allocation (RRA) the fronthaul compression methods may be optimized, e.g. by selecting a suitable modulation order. For instance, the modulation order may be increased or decreased depending on the fronthaul capacity and air interface conditions. At the cost of trading off some air interface performance, the fronthaul load can be significantly reduced.

FIG. 1 illustrates schematically an environment in which embodiments according to the present teachings may be implemented. As indicated earlier, fronthaul is associated with a type of radio access network (RAN) 1 architecture that comprises centralized baseband controllers, denoted central unit 2 herein, and standalone remote radio units, denoted remote unit 3 herein. The remote unit 3 comprises radio frequency (RF) processing means 10a, 10b for uplink (UL) processing and downlink (DL) processing. The central unit 2 may be located at a centralized location wherein it may serve several remote units 3, while the remote units 3 may be located at the cell site providing wireless communication to communication devices 12 (in the following exemplified by user equipment, UE). The fronthaul network 5 interconnects the central unit 2 and the remote unit(s) 3. The fronthaul network 5 interconnecting the central unit 2 and the remote unit 3 may comprise a single direct link or may comprise multiple hops comprising e.g. routers and/or switches. For instance, the fronthaul network 5 may comprise several links: a first link interconnecting the central unit 2 with a router, a second link interconnecting the router with a switch and a third link interconnecting the switch and the remote unit 3.

Briefly, a method and a scheduler entity 4 are provided, which in some embodiments is used in MAC layer in radio access network 1, deployed in a CRAN architecture. The scheduler entity 4 is made aware of the fronthaul transport capacity, in particular fronthaul load and may execute a joint Link Adaptation (LA) and RRA strategy that prioritizes the usage of highly compressible constellations, in such a way that traffic over the fronthaul network can be decreased, hence reducing the load. At the same time, the scheduler entity 4 tries to limit the impact on the end user/system performance. The method is based on making a trade-off between air interface performance and fronthaul load, wherein a reduced air interface performance may enable a reduced load on the fronthaul network. By reducing the air interface performance in order to allow a higher signal compression gives the opportunity to reduce fronthaul load or transport more (radio) data in the fronthaul network 5 for the same fronthaul load.

The scheduler entity 4 is made aware of capacity (throughput) limitations in the fronthaul network 5 connected to the central unit 2. Additionally, the scheduler entity 4 may be provided with further information about the fronthaul network, such as for instance transmit buffer and receive buffer usage for the fronthaul network.

The radio payload (time domain or frequency domain samples) is compressed before transmission over the fronthaul network 5, as indicated in FIG. 1. In particular, the remote unit 3 and the central unit 2 each comprise compression means 6, 9 for compressing the signal before transmission over the fronthaul network 5. The remote unit 3 comprises decompression means 7 for decompressing the signal received from the central unit 2 over the fronthaul network 5 (i.e. DL signals), and correspondingly the central unit 2 comprises decompression means 8 for decompressing the signal received from the remote unit 3 (i.e. UL signals) over the fronthaul network 5. Baseband signals with smaller constellations, such as e.g. Quadrature phase-shift keying (QPSK) and Quadrature amplitude modulation (QAM16), can be compressed to a higher degree than highly efficient constellations, such as e.g. QAM64 and QAM256. In particular, by using a higher-order constellation it is possible to transmit more bits per symbol, but if the mean energy of the higher-order constellation is to be kept the same as for a lower-order constellation, the constellation points has to be closer together. This results in higher bit error rate for the higher-order constellation than for the lower-order constellation given the same mean energy. If the higher-order modulation is to be used without increasing the bit error rate, then the signal energy has to be increased and/or noise be reduced. Error vector magnitude (EVM) is a measure of modulation accuracy and error performance; EVM is the difference between an ideal symbol vector and the actual measured vector.

Next, scheduling strategies in the scheduling entity 4 according to embodiments of the present teachings are described.

In accordance with an aspect of the present teachings, a known radio resource assignment procedure is modified in order to select compression methods used in the fronthaul interfaces. To achieve this, advantage is taken of information conventionally used by (and hence available to) the scheduler entity 4, for instance, information about the Channel Quality Indicator (CQI) for Uplink (UL) and Downlink (DL). In some embodiments, retransmission counters may also be utilized or similar radio link condition indicators, as additional input parameters. In particular, Acknowledgements/negative acknowledgements (ACKs/NACKs) and Hybrid automatic repeat request (HARQ) re-transmission information may be used for tracking a target (BER) in Outer Loop Link Adaptation (OLLA) methods. In some embodiments, a first pass scheduling procedure is executed, wherein radio resources are assigned to UEs, according to their radio link conditions and using some known radio resource allocation strategy (e.g. round-robin, proportional-fair). Next, a second pass scheduling procedure on the scheduling grants can modify the radio resource allocation result of the first pass by decreasing the modulation order used in groups of resource elements. This decrease in modulation order aids the fronthaul compression methods in the following manner:

- In DL, if the maximum modulation order is reduced, the corresponding error vector magnitude (EVM) target increases. Consequently, the compression algorithm used by the fronthaul interface can increase the compression ratio by a proportional amount.
- In UL, Modulation and Coding Scheme (MCS) is chosen such that a certain Block Error Rate (BLER) target is reached (e.g. 10% in LTE). In LTE, the CQI (which in essence is an indicator of Signal-to-Noise-Ratio, SNR) corresponds to a certain transport block size and modulation scheme that will result in best (fastest) transmission with BLER 10%. If the modulation scheme is lowered but the target BLER is kept the same, the exceeding SNR can be used to increase the compression over the fronthaul interface.

Figure 2:
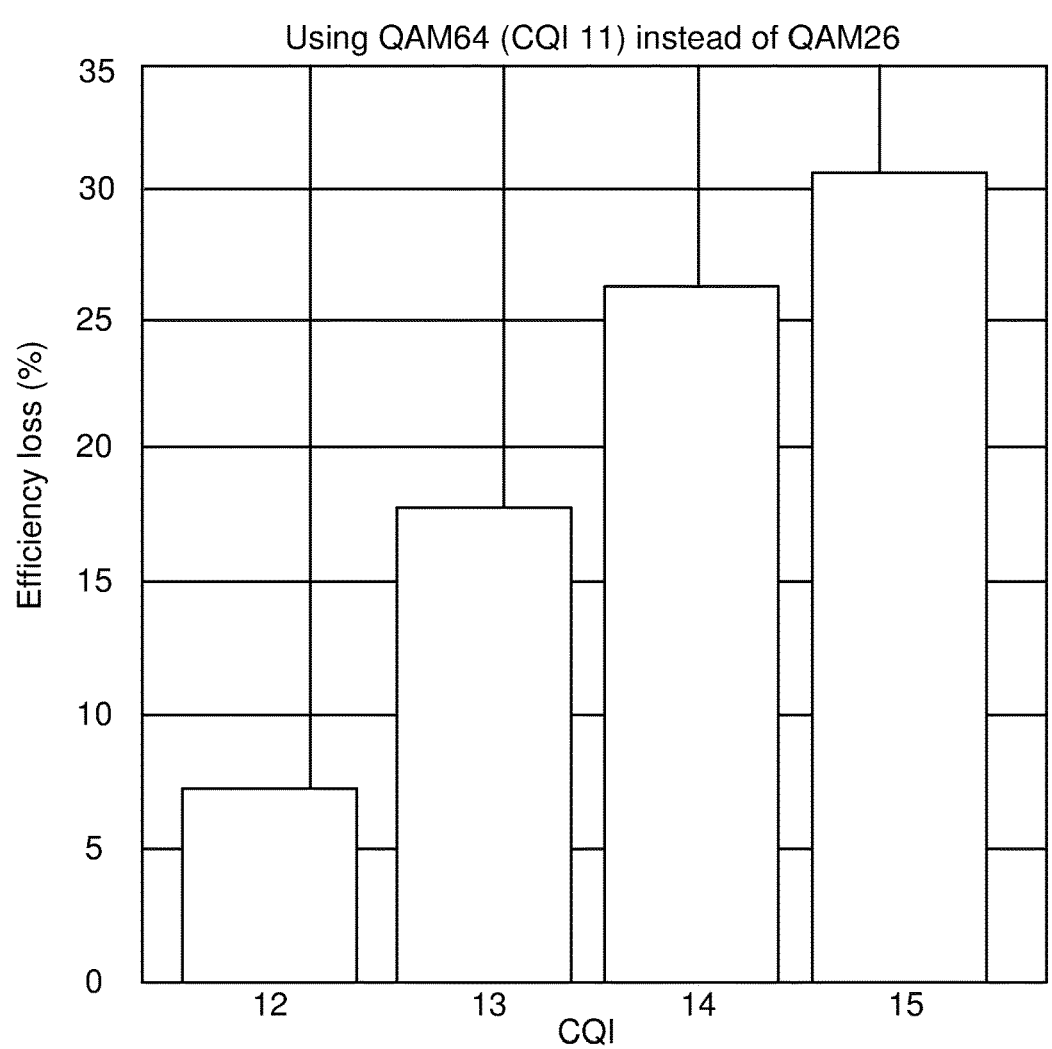
FIG. 2 is a graph illustrating examples of air interface efficiency losses when using different modulation schemes.
Figure 3:
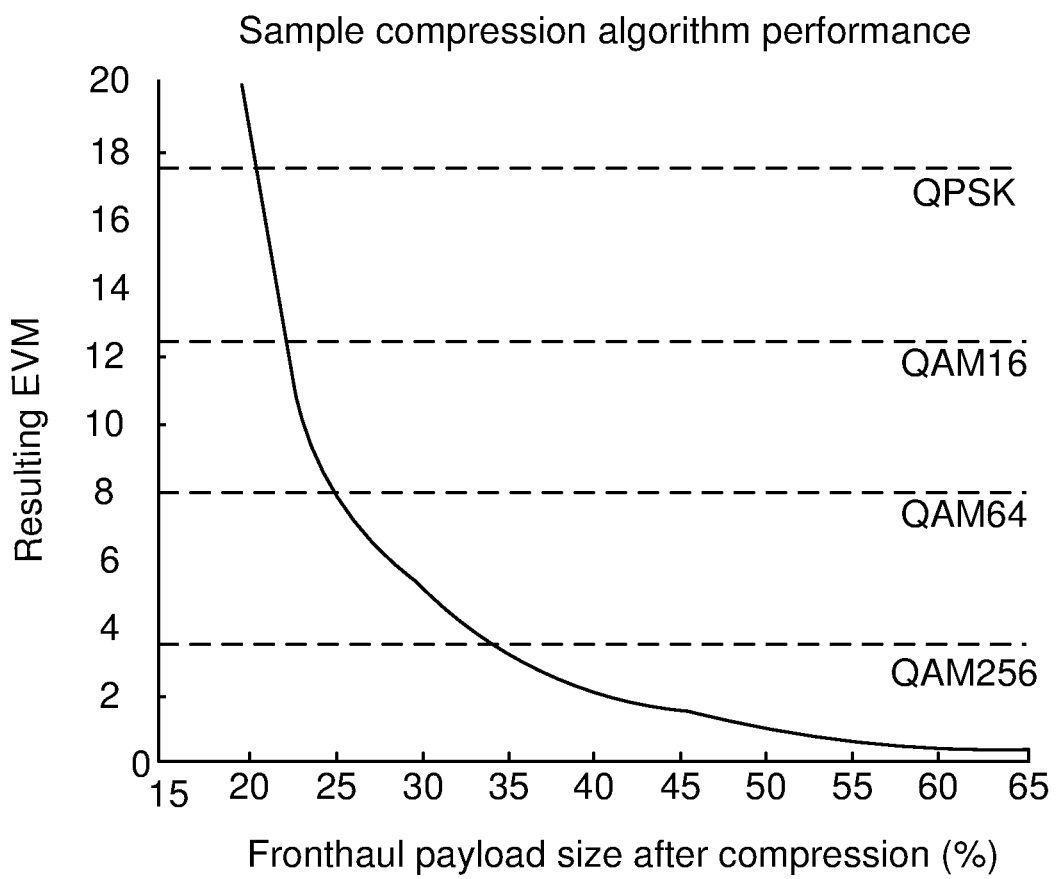
FIG. 3 is a graph illustrating examples of compression algorithm performance.

FIGS. 2 and 3 illustrate the above indicated tradeoff between air interface performance and fronthaul load.

FIG. 2 illustrates an example of air interface efficiency loss in percentages, for each Channel Quality Indicator (CQI) higher than CQI 11. This represents the choice of using QAM64 instead of QAM256 at different code rates. Each bar in the graph of FIG. 2 represents the loss in spectral efficiency resulting from choosing a QAM64 constellation with the most efficient code rate instead of QAM256. As can be seen in the graph, when the QAM256 with high redundancy is used (CQI 12), the loss of efficiency is around 8%. The loss is higher for higher code rates, e.g. around 32% when using QAM64 instead of QAM256 for CQI 15.

In FIG. 3, a realistic model for a compression algorithm performance is shown. The x-axis represents the compression ratio, and the y-axis the resulting EVM.

Compression ratio may be defined as ratio between original data-representation size and compressed data representation size (size of uncompressed data representation divided by size of compressed data). EVM limits (i.e. EVM targets) for the respective modulation orders (QAM256, QAM64, QAM16, QPSK) are depicted with the horizontal dashed lines. Using this specific sample compression method, a change of highest modulation order from QAM256 to QAM64 could result in savings on fronthaul traffic of around 30%. If establishing that, for instance, a higher EVM is acceptable, the MCS for one or more communication devices 12 can be reduced, and this leads to that the compression ratio over the fronthaul network may be increased.

The above types of tradeoff are exploited in the herein disclosed radio resource allocation strategy.

In order for the scheduler entity 4 to decide whether to prioritize air interface performance or fronthaul load performance, the compression method capabilities are exposed to the scheduler entity 4. This may, for instance, be realized by means of a numerical representation (a mathematical model) of the compression algorithm performance. An example of what such compression algorithm models could be is the curve presented in FIG. 3. A further example of a compression algorithm model is a lookup table containing compression algorithm input settings, achievable compression ratio and resulting air interface performance degradation according to a certain criteria (e.g. EVM).

In some embodiments, the fronthaul interface modules (i.e. central unit 2 and remote unit 3) communicate with a network node, e.g. base station, at startup, informing the base station of the module's hardware capabilities, such as maximum capacity. The fronthaul modules 2, 3 may also provide information on their compression algorithm model.

Figure 4A:
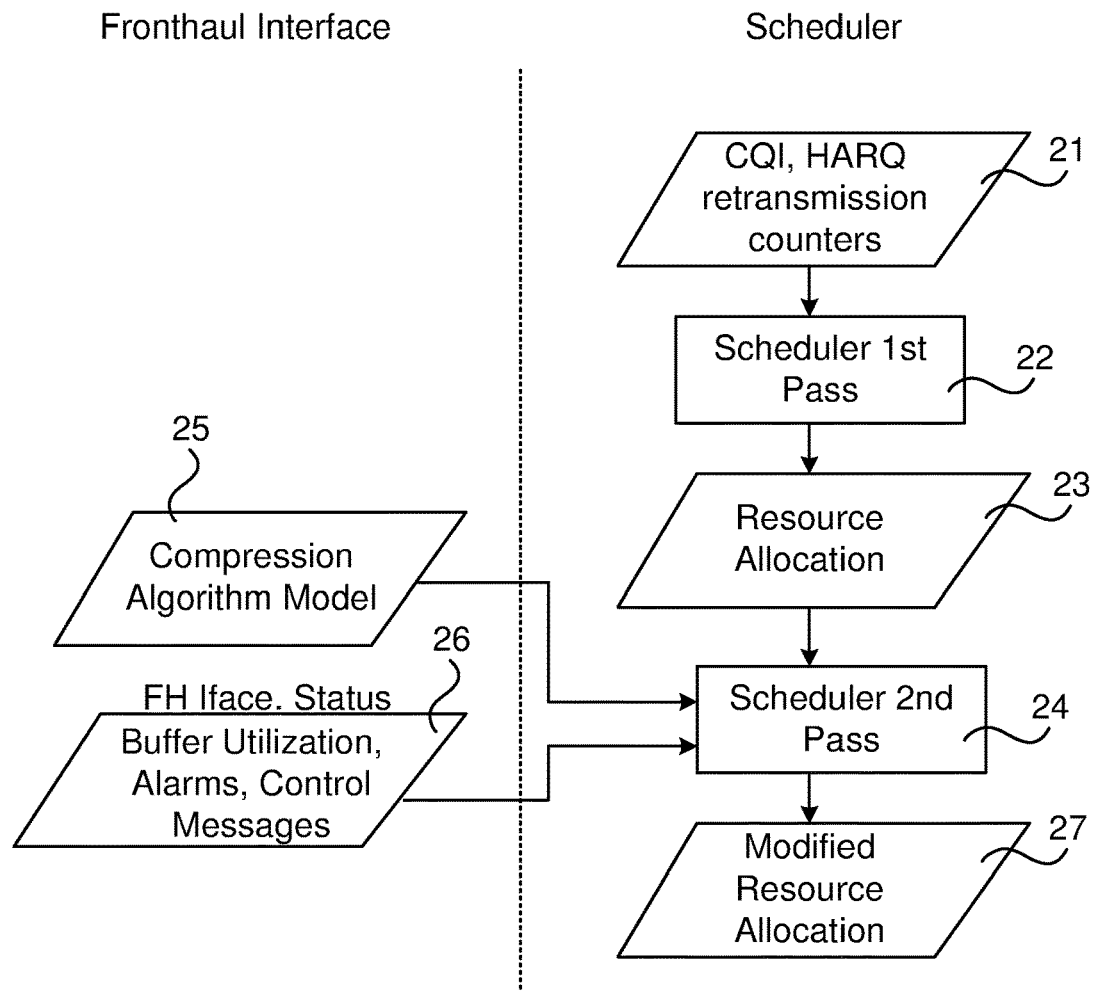
FIGS. 4a and 4b are flow charts illustrating some embodiments in accordance with the present teachings.

FIG. 4*a* is a flow chart illustrating different embodiments in accordance with the present teachings, including the above mentioned embodiments. The flow 20 illustrated in FIG. 4*a* may be implemented as a method in the scheduler entity 4. Boxes 21, 22 and 23 may implement a known scheduling method, wherein the scheduler entity 4 may allocate (box 22) resources to UEs according to various radio link condition indicators, exemplified in box 21 by CQI and by HARQ retransmission counter values, and according to a radio resource allocation algorithm such as e.g. round robin, as described earlier. The resulting resource allocation (box 23) may hence be according to known scheduling methods. In accordance with the present teachings, a second scheduling consideration ("second pass") is made. In particular, in box 24, the scheduler entity 4 may modify the resource allocation decided in box 23, based on e.g. compression algorithm model (box 25) used in the fronthaul modules 2, 3 and information on the fronthaul network load. The compression algorithm model may, for instance, comprise the model as shown in and described with reference to FIG. 3. The fronthaul network load information (box 26) may, for instance, comprise buffer utilization, alarms e.g. if buffer is close to being full, control messages, e.g. feedback messages from congestion control methods conveying a value of some metric, e.g. delay variation, or request messages for increasing/decreasing sending rate. As yet another example of the fronthaul network load information ACK/NACK messages may be mentioned; while not directly indicating load on the fronthaul network 5, their (inter-)arrival times, or mere existence, may be used for identifying impending or already occurring problematic situations such as congestion, link loss etc. The modified resource allocation (box 27) may, for instance, comprise a decreased modulation order to be used in groups of resource elements. The scheduler entity 4 then instructs the fronthaul modules 2, 3 to adapt their compression method, and the fronthaul modules 2, 3 may then use their compression algorithm with increased compression ratio (in downlink).

Figure 4B:
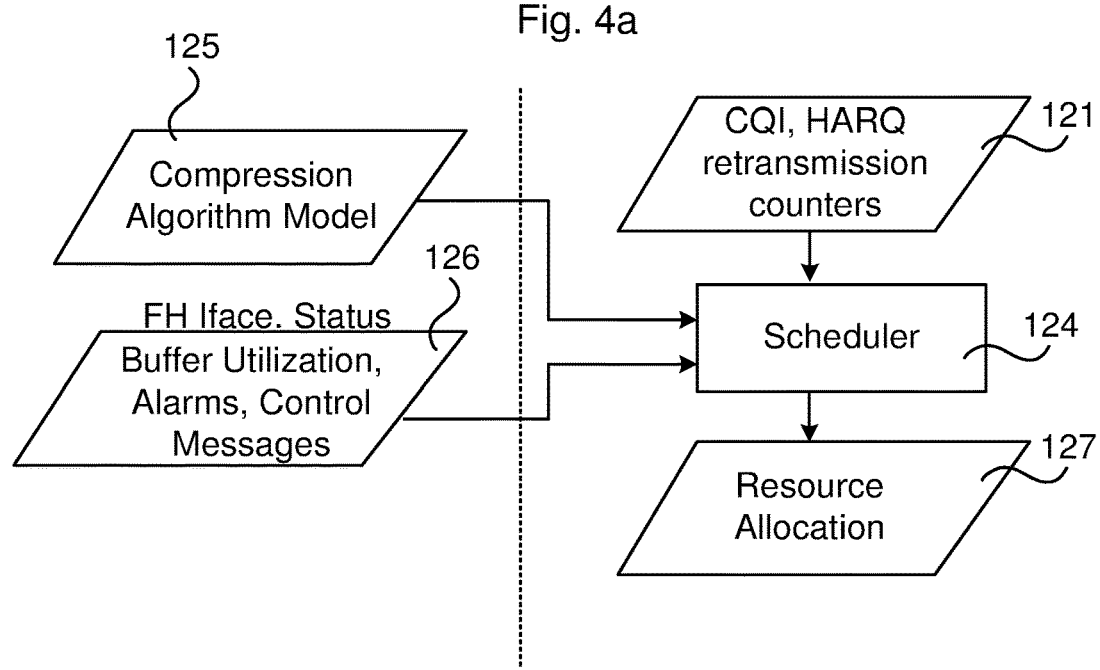

FIG. 4*b* is a flow chart illustrating different embodiments in accordance with the present teachings, including the above mentioned embodiments. The flow illustrated in FIG. 4*b* may be implemented as a method in the scheduler entity 4. In contrast to the flow chart of FIG. 4a, wherein the scheduler entity 4 first does a conventional resource allocation (Scheduler first pass, boxes 22 and 23) and then adapts the resource allocation according to fronthaul (capacity) limitations (scheduler second pass, boxes 24 and 27), this embodiment incorporates the fronthaul (capacity) limitations in the radio resource allocation algorithm. That is, a single radio resource allocation is made, in which the fronthaul (capacity) limitations are used as additional constraints in the radio resource allocation algorithm. In box 124 thus, the scheduler receives compression algorithm model (box 125), which is equivalent with box 25 of the embodiment of FIG. 4a (i.e. description of box 25 is applicable also for box 125), used in the fronthaul modules 2, 3 (e.g. receives the information from the fronthaul modules 2, 3) and various information (box 126), e.g. buffer utilization etc. (description of box 26 is applicable also for box 126) just as in the flow chart of FIG. 4a (description of box 26 is applicable also for box 126). In the resource allocation, the scheduler entity 4 also uses various radio link condition indicators, exemplified in box 121 by CQI and by HARQ retransmission counter values. As has been mentioned, the method may be implemented and adapted for time domain as well as frequency domain compression approaches, and is thereby able to support different fronthaul interfaces. Next, some implementation details related to specific time-domain and frequency domain sampled fronthaul interfaces are given.

Figure 5:
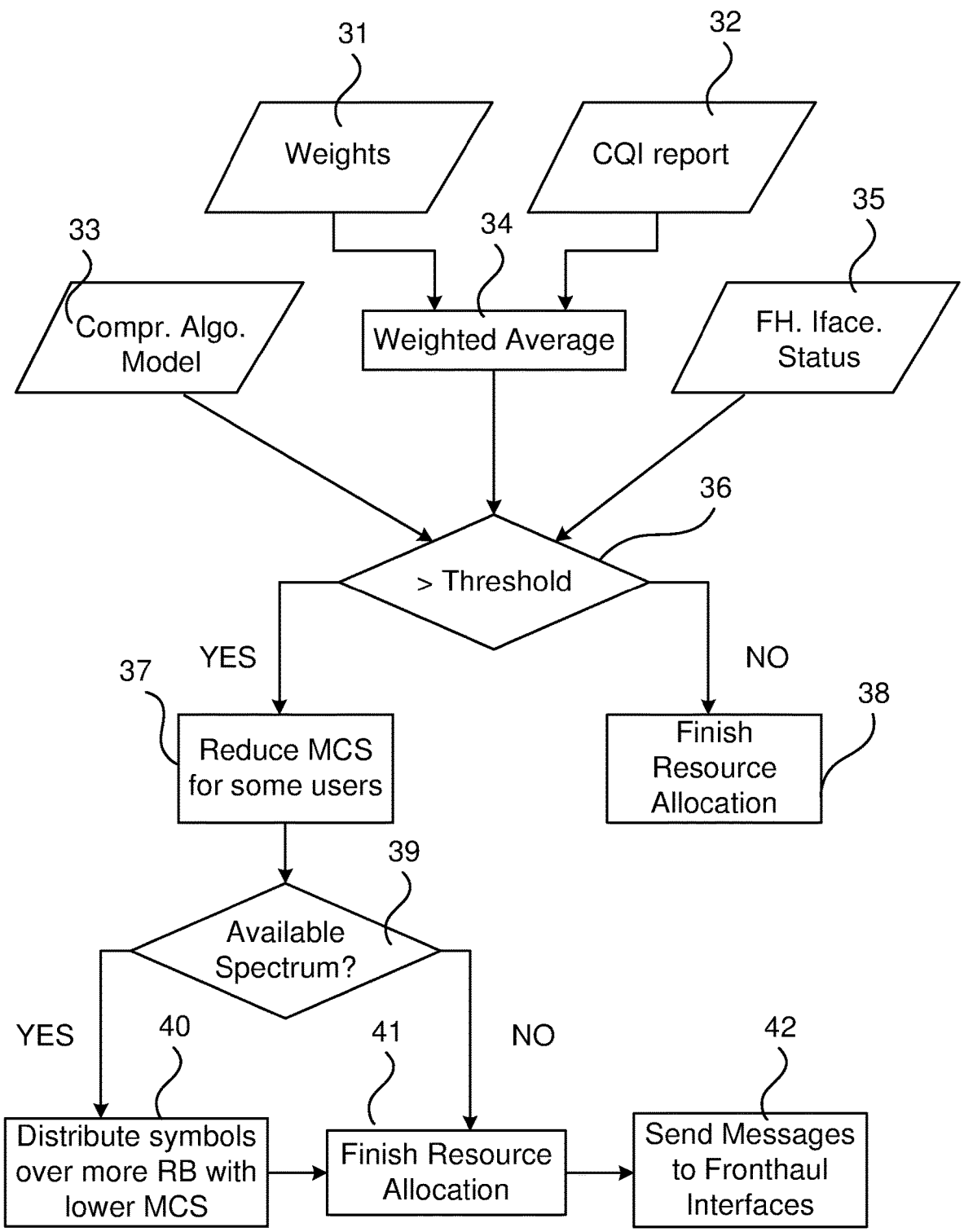
FIG. 5 is a flow chart illustrating scheduling strategies in accordance with the present teachings.

FIG. 5 is a flow chart illustrating some embodiments in accordance with the present teachings, and in particular a Time-Domain interface scheduling strategy.

In box 36 a decision is made whether or not it is acceptable to reduce air interface performance in order to reduce load on the fronthaul network 5. This decision may be a threshold-based decision, taking into account one or more of: the compression algorithm model (box 33), e.g. as illustrated in FIG. 3 (description of box 26 is applicable also for box 33), weights (box 31), CQI reports (box 32), fronthaul interface status (box 35), e.g. buffer utilization etc. (description of box 26 is applicable also for box 35) and weighted average (box 34). If the decision is that it is not acceptable or possible to reduce air interface performance, then the flow ends in box 38, and resource allocation is finished.

If the decision is that the fronthaul load could be reduced (air interface performance can be reduced), then flow continues to box 37.

When time-domain samples (an example of baseband signal information) are being transmitted over the time-domain fronthaul interface (denoted C1 in the following) and EVM is a hard requirement, users being assigned the highest modulation order may be instructed to use less spectrally efficient modulation schemes, resulting in a larger compression budget.

Depending on what share of the resources the users with high MCS occupy, it might be disadvantageous to reduce their modulation order. Additionally, since in these interfaces C1 signals to/from all UEs are combined, only a single compression ratio is typically allowed.

To address this, the scheduler entity 4 decisions may be based on a weighted average of the CQIs (as indicated by boxes 32, 34). The scheduler entity 4 would then:

Calculate a weighted average (box 31) of users' CQI. The weights for each UE can be defined based on number of resource blocks per radio frame used, Quality-of-Service (QoS) or other similar metric.

Compare the result with a threshold (box 36) and decrease (box 37) modulation order for everyone above said threshold.

As an alternative method, at least for uplink, the scheduler entity 4 may concentrate used resource blocks (RBs) e.g. close to the center of the carrier when load is less than 100%. This may make it easier to compress the signal using e.g. linear predictive coding (LPC) and/or resampling.

Additionally, if spectrum is available, determined in box 39, i.e. if the subframe usage is not full, the scheduler entity 4 may also allocate more resource blocks for a given UE in order to minimize the loss of throughput. For instance, the scheduler entity 4 may allocate 3 RBs using QAM16 instead of allocating 2 RBs using QAM64. If spectrum is available, flow continues to box 40 and the scheduler tries to spread the payload over many resource blocks with low MCS (box 40). The resource allocation is finished (box 41) and the flow ends in box 42 wherein the scheduler entity 4 send messages to the fronthaul modules 2, 3 (i.e. remote unit 3 and the central unit 2).

Figure 6:
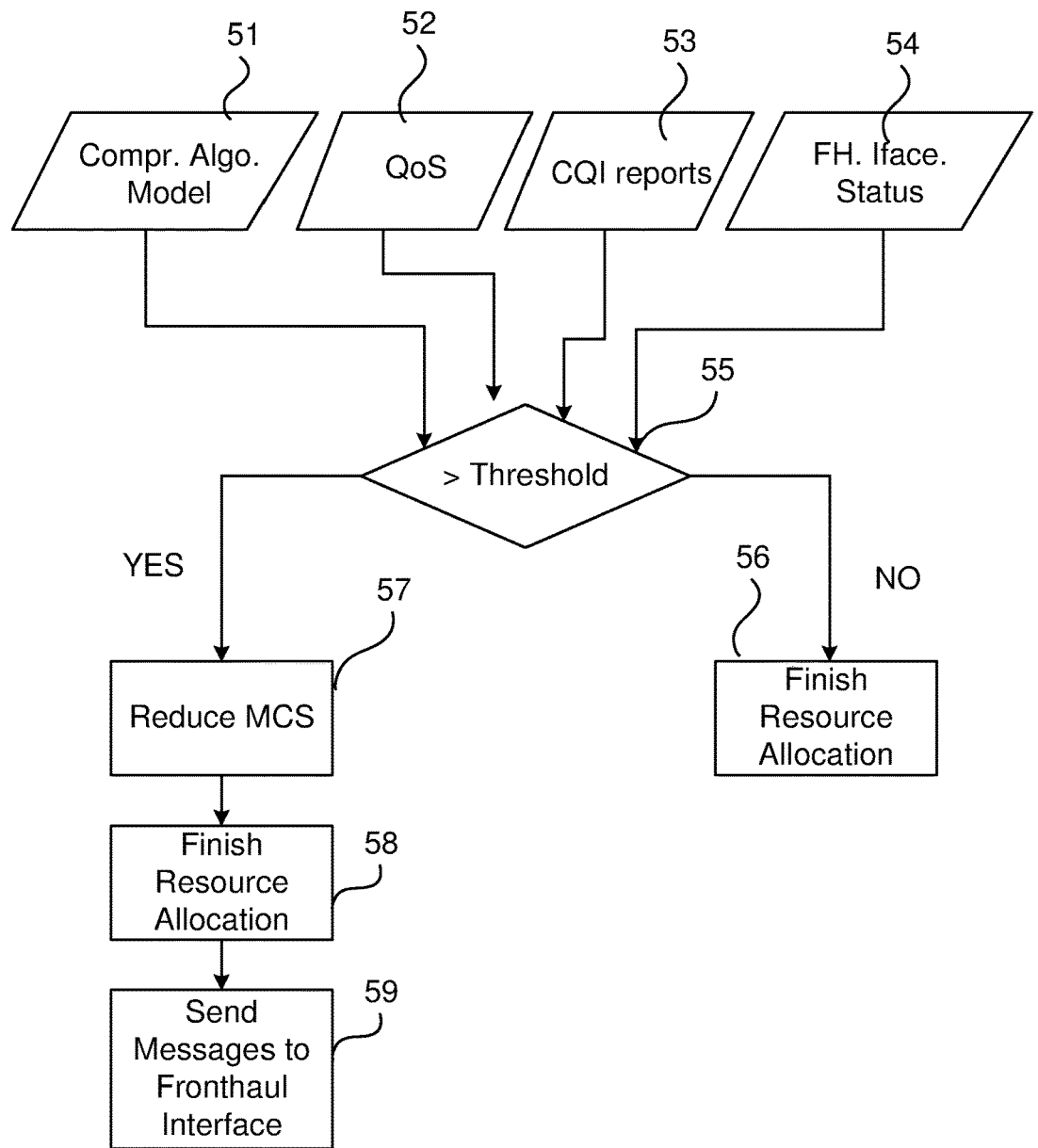
FIG. 6 is a flow chart illustrating different embodiments of a scheduling algorithm in accordance with the present teachings.

FIG. 6 is a flow chart illustrating scheduling strategies in accordance with the present teachings, and in particular scheduling strategies for Frequency-Domain interface scheduling strategy in accordance with the present teachings.

In box 55 a decision is made whether or not it is acceptable to reduce air interface performance in order to reduce load on the fronthaul network 5. This decision may be a threshold-based decision, taking into account one or more of: the compression algorithm model (box 51), e.g. as illustrated in FIG. 3 (description of box 25 is applicable also for box 51), Quality of Service (QoS) per UE 12 (box 52), CQI reports (box 53) and fronthaul interface status (box 54), e.g. buffer utilization etc. (description of box 26 is applicable also for box 54). If the decision is that it is not acceptable or possible to reduce air interface performance, then the flow ends in box 56, and resource allocation is finished.

If the decision is that the fronthaul load could be reduced (air interface performance can be reduced), then flow continues to box 57.

When a frequency-domain interface (denoted C2 in the following) is used, compression ratio can be individualized per UE 12. In this situation, the scheduler entity 4 may take decisions based on QoS per UE 12. That is, if the decision in box 55 is that fronthaul load could be reduced, flow continues to box 57, wherein the MCS may be reduced for individual UEs. The flow continues to box 58, wherein the resource allocation is finished. The flow ends in box 59, wherein the scheduler entity 4 sends messages to the fronthaul modules 2, 3 (i.e. remote unit 3 and the central unit 2).

From the description it is clear that compression ratio may be increased after decreasing modulation order since this enables reduction of the number of bits used for quantization. This is true for a time-domain fronthaul interface and also for frequency-domain fronthaul interfaces. However, for a frequency-domain interface, it may also be possible to increase compression ratio by doing the opposite, i.e. by increasing modulation order but instead scheduling fewer resource blocks. In particular, for a frequency-domain fronthaul interface, samples for unused resource blocks do not have to be transmitted, and sending fewer samples but with more bits each can sometimes result in a lower bitrate.

In summary, the present teachings suggest a scheduler entity aware of the fronthaul capacity limitations. Link adaptation (LA) and RRA can be made prioritizing the usage of highly compressible constellations, in such a way that traffic over the fronthaul network can be decreased. Fronthaul control interfaces may be utilized for exchanging information between central and remote units 2, 3 about the compression algorithm model and fronthaul capacity limitations. The resulting compression ratio may be directly determined by fronthaul capacity limitations and/or network performance parameters. A MCS order reduction strategy is used to achieve high compression ratios with slight air interface performance degradation. For time-domain sampled interface (C1), a weighted average of reported CQIs (e.g. based on frame RBs usage or QoS) may be defined to aid the scheduler to perform the MCS order reduction strategy. For time-domain sampled interface (C1), the scheduler entity may choose to distribute data among more resource blocks with lower MCS if spectrum is available. This in turns leads to higher compression ratio.

Figure 7:
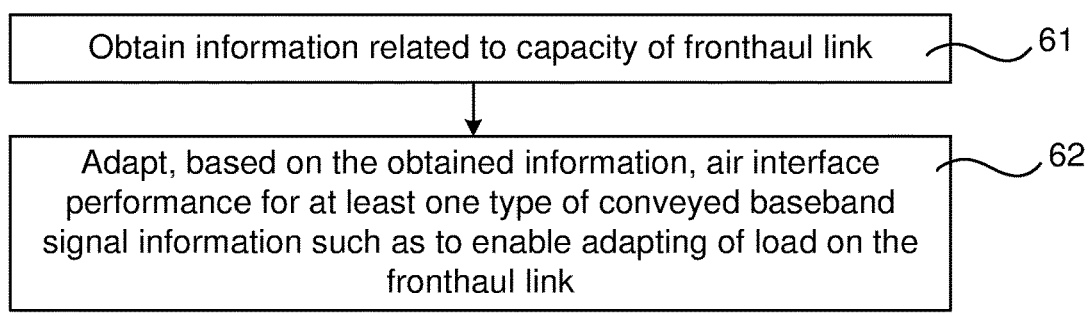
FIG. 7 illustrates a flow chart over steps of an embodiment of a method in a scheduler entity in accordance with the present teachings.

The various features and embodiments that have been described can be combined in many different ways, examples of which are given next, with reference first to FIG. 7.

FIG. 7 is a flow chart illustrating different embodiments of a method in a scheduler entity in accordance with the present teachings. A method 60 is provided, which may be performed in a scheduler entity 4 for adapting load on a fronthaul network 5 in a radio access network 1 comprising a central baseband unit 2 and a remote radio unit 3. The central baseband unit 2 and the remote radio unit 3 are interconnected by the fronthaul network 5 over which baseband signal information is exchanged. The base band signal information is information required to assemble a baseband signal. For instance, the baseband signal information may be one or more of: baseband samples, modulated symbols, time-domain samples, and frequency domain symbols. The method 60 may be performed as part of a scheduling method performed in the scheduling entity 4.

The method 60 comprises obtaining 61 information related to capacity of the fronthaul network 5. Example of such information comprise fronthaul load, throughput limitations, transmit buffer usage of a fronthaul module 2, 3, receive buffer usage of a fronthaul module 2, 3, congestion indicator and congestion alarm.

The method 60 comprises adapting 62, based on the obtained information, air interface performance for at least one type of conveyed baseband signal information such as to enable adapting of load on the fronthaul network 5. Adapting the air interface performance may, for instance, comprise adapting a parameter or an indicator or a value related to the air interface performance. As a particular example, the coding and modulation may be adapted, e.g. MCS. By reducing the MCS for one or more communication devices 12, the compression ratio in the fronthaul network may be increased.

In some embodiments, the adapting 62 comprises adapting air interface performance for at least one communication device 12 such as to enable adapting of load on the fronthaul network 5. In particular, the method 60 is applicable for use in scheduling communication devices and also in a scenario wherein the cell is completely idle, i.e. when the fronthaul network is carrying only broadcast/control channels and there are no allocated communication devices 12. That is, a lower modulation order in these channels is also applicable to the compression model as illustrated in FIG. 3.

In some embodiments, the adapting 62 comprises using a compression algorithm model providing obtainable compression of the baseband signal information for different modulation orders, wherein the obtainable compression fulfills an air interface performance criterion, such as, for instance, EVM. An example of such model was given in FIG. 3 and related description, but various other compression algorithm models may be used.

In some embodiments, the method 60 comprises, prior to the adapting 62, performing a preliminary allocation of radio resources to one or more communication devices 12 (see box 23 of FIG. 4 and related description) and comprising, after the adapting 62, modifying the preliminary allocation of radio resources (see box 27 of FIG. 4 and related description) according to the adapted air interface performance. The preliminary allocation of radio resources may be performed according to a prior art method. The adapting may comprise determining, based on the information related to the capacity of the fronthaul network 5, a modulation order for the one or more communication devices 12. Reducing the modulation order enables the compression ratio of the baseband signal information on the fronthaul to be increased.

In other embodiments, the method 60 comprises allocating radio resources to one or more communication devices 12 based at least on the adapted air interface performance. Referring to FIG. 4 again, this embodiment would correspond to boxes 23 and 27 being integrated, i.e. a single resource allocation is made, e.g. based on the compression algorithm model.

In various embodiments, the method 60 comprises instructing the remote radio unit 3 and the central baseband unit 2 to increase compression ratio, thus reducing the load on the fronthaul network 5. By, for instance, reducing the air interface performance by reducing the modulation and coding scheme (MCS) for one or more communication devices, the compression ration may be increased. The scheduler entity 4 instructs the fronthaul modules (i.e. remote radio unit 3 and the central baseband unit 2) accordingly. For instance, the adapting the air interface performance may comprise reducing a maximum modulation order of a modulation scheme and the load on the fronthaul network 5 is adapted by the scheduler instructing the remote radio unit 3 and the central baseband unit 2 to increase compression ratio in relation to the reduction of maximum modulation order.

In various embodiments, the adapting the air interface performance comprises reducing the air interface performance by reducing the modulation and coding scheme for the at least one communication device 12.

In various embodiments, the baseband signal information comprises time-domain samples and wherein the adapting the air interface performance comprises reducing modulation order for each communication device 12 having a channel quality indicator fulfilling a threshold criterion, wherein the threshold criterion is based on a weighted average of the respective channel quality indicator for each communication device 12 to be scheduled. Embodiments corresponding to this embodiment ware described with reference to 5.

In a variation of the above embodiment, weights for each communication device 12 are based on one or both of: number of resource blocks per used radio frame and quality of service for each communication device 12.

In various embodiments, wherein the baseband signal information comprises frequency-domain samples, the adapting the air interface performance comprises reducing maximum modulation order of a modulation scheme based on quality of service per communication device 12 and the adapting of load on the fronthaul network 5 comprises instructing the remote radio unit 3 and the central baseband unit 2 to adapt compression ratio of data per communication device 12.

Embodiments corresponding to this embodiment were described with reference to 6. As mentioned in relation to description of FIG. 6, for a frequency-domain interface, the compression ratio may be increased by increasing modulation order and scheduling fewer resource blocks. In some embodiments thus, the adapting 62 the air interface performance comprises increasing modulation order and using fewer resource blocks when scheduling traffic for at least one communication device, thereby enabling adapting of load on the fronthaul network 5 by increasing compression ratio.

In various embodiments, the information related to the fronthaul network 5 comprises one or more of: fronthaul load, throughput limitations, transmit buffer usage of a fronthaul module 2, 3, receive buffer usage of a fronthaul module 2, 3, congestion indicator and congestion alarm.

Figure 8:
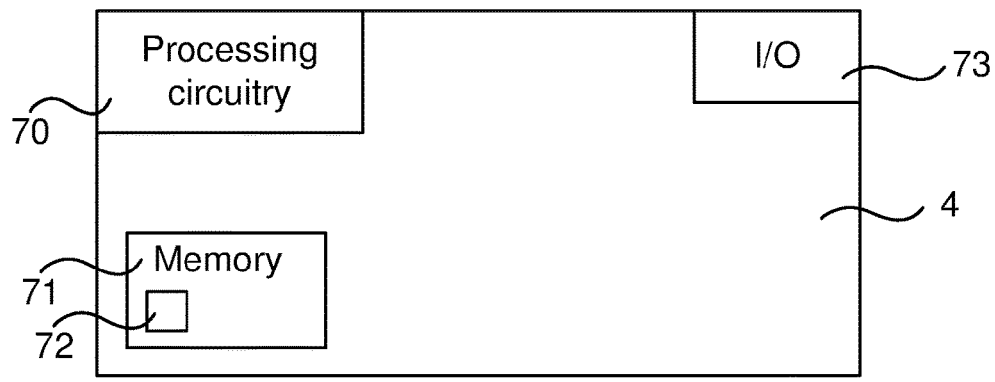
FIG. 8 illustrates schematically a scheduler entity and means for implementing embodiments of the method in accordance with the present teachings.

FIG. 8 illustrates schematically a scheduler entity 4 and means for implementing embodiments of the method in accordance with the present teachings. The scheduler entity 4 may be part of another node (e.g. a radio access node, such as an eNB) or a standalone entity. The scheduler may be part of hardware implementing the MAC layer, i.e. be part of a media access controller. The scheduler entity 4 comprises processing circuitry 70, which may be any combination of one or more of a suitable central processing unit (CPU), multiprocessor, microcontroller, digital signal processor (DSP), etc., capable of executing software instructions stored in a computer program product 71, e.g. in the form of a storage medium 71. The processing circuitry 70 may further be provided as at least one application specific integrated circuit (ASIC), or field programmable gate array (FPGA).

The processing circuitry 70 is configured to cause the scheduler entity 4 to perform a set of operations, or steps, e.g. as described in relation to FIG. 7. For example, the storage medium 71 may store the set of operations, and the processing circuitry 70 may be configured to retrieve the set of operations from the storage medium 71 to cause the scheduler entity 4 to perform the set of operations. The set of operations may be provided as a set of executable instructions. The processing circuitry 70 is thereby arranged to execute methods as disclosed herein.

The storage medium 71 may also comprise persistent storage, which, for example, can be any single one or combination of magnetic memory, optical memory, solid state memory or even remotely mounted memory.

The scheduler entity 4 may also comprise an input/output device 73 for communicating with other entities and devices. The input/output device 73 may be an interface and may, for instance, comprise a protocol stack, for communication with other devices or entities. The input/output device 73 may be used for receiving data input and for outputting data.

A scheduler entity 4 is provided for adapting load on a fronthaul network 5 in a radio access network 1 comprising a central baseband unit 2 and a remote radio unit 3. The central baseband unit 2 and the remote radio unit 3 are interconnected by the fronthaul network 5 over which baseband signal information is exchanged. The scheduler entity 4 is configured to:
  obtain information related to capacity of the fronthaul network 5, and
  adapt, based on the obtained information, air interface performance for at least one type of conveyed baseband signal information such as to enable adapting of load on the fronthaul network 5.

The scheduler entity 4 may be configured to perform the above steps e.g. by comprising processing circuitry 70 and memory 71, the memory 71 containing instructions executable by the processing circuitry 70, whereby the scheduler entity 4 is operative to perform the steps. That is, in an embodiment, a scheduler entity 4 is provided. The scheduler entity 4 comprises processing circuitry 70 and memory 71, the memory 71 containing instructions executable by the processing circuitry 70, whereby scheduler entity 4 is operative to: obtain information related to capacity of the fronthaul network 5, and adapt, based on the obtained information, air interface performance for at least one type of conveyed baseband signal information such as to enable adapting of load on the fronthaul network 5.

In an embodiment the scheduler entity 4 is configured to adapt by using a compression algorithm model providing obtainable compression of the baseband signal information for different modulation orders, wherein the obtainable compression fulfills an air interface performance criterion.

In some embodiments the scheduler entity 4 is configured to, prior to the adapting, perform a preliminary allocation of radio resources to one or more communication devices 12 and configured to, after the adapting, modify the preliminary allocation of radio resources according to the adapted air interface performance.

In some embodiments the scheduler entity 4 is configured to allocate radio resources to one or more communication devices 12 based at least on the adapted air interface performance.

In some embodiments the scheduler entity 4 is configured to instruct the remote radio unit 3 and the central baseband unit 2 to increase compression ratio, thus reducing the load on the fronthaul network 5.

In various embodiments the scheduler entity 4 is configured to adapt by reducing the air interface performance by reducing the modulation and coding scheme for the at least one communication device 12.

In some embodiments the scheduler entity 4 is configured to adapt the air interface performance by reducing maximum modulation order of modulation scheme and to adapt load on the fronthaul network 5 by instructing the remote radio unit 3 and the central baseband unit 2 to increase compression ratio in proportion to the reduction of maximum modulation order.

In some embodiments the scheduler entity 4 is configured to the baseband signal information comprises time-domain samples and the scheduler entity 4 being configured to adapt the air interface performance by reducing modulation order for each communication device 12 having a channel quality indicator fulfilling a threshold criterion, wherein the threshold criterion is based on a weighted average of the respective channel quality indicator for each communication device 12 to be scheduled.

In a variation of the above embodiment weights for each communication device 12 is based on one or both of: number of resource blocks per used radio frame and quality of service for each communication device 12.

In some embodiments, wherein the baseband signal information comprises frequency-domain samples, the scheduler entity 4 is configured to adapt the air interface performance by reducing maximum modulation order of a modulation scheme based on quality of service per communication device 12 and to adapt load on the fronthaul network 5 by instructing the remote radio unit 3 and the central baseband unit 2 to adapt compression ratio of data per communication device 12.

In various embodiments, the information related to the fronthaul network 5 comprises one or more of: fronthaul load, throughput limitations, transmit buffer usage of a fronthaul module 2, 3, receive buffer usage of a fronthaul module 2, 3, congestion indicator and congestion alarm.

Figure 9:
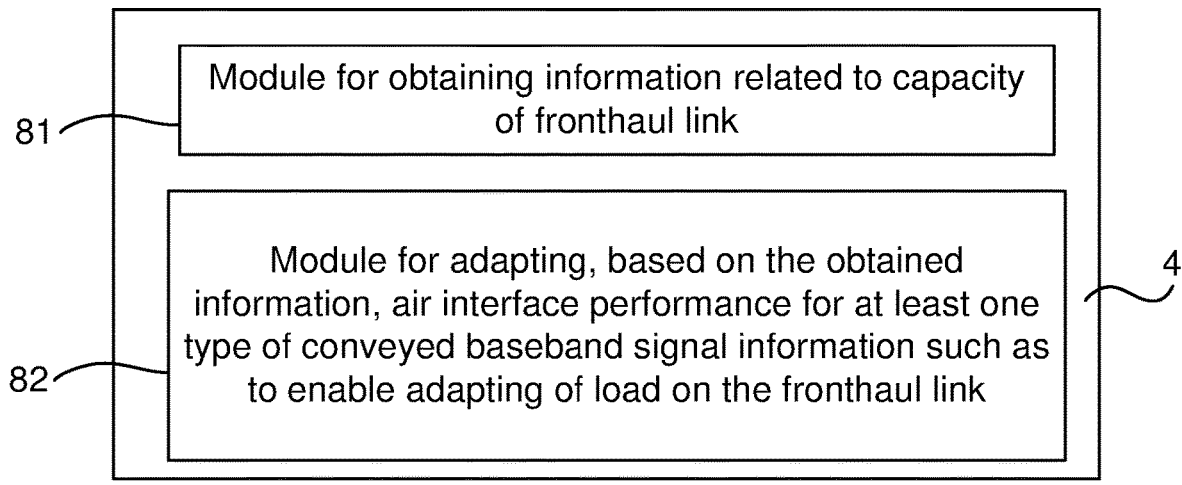
FIG. 9 illustrates a scheduler entity comprising function modules/software modules for implementing embodiments of the present teachings.

FIG. 9 illustrates a scheduler entity 4 comprising function modules/software modules for implementing embodiments of the present teachings. The function modules can be implemented using software instructions such as computer program executing in a processor and/or using hardware, such as application specific integrated circuits (ASICs), field programmable gate arrays, discrete logical components etc., and any combination thereof. Processing circuitry may be provided, which may be adaptable and in particular adapted to perform any of the steps of the method 60 that has been described in various embodiments.

A scheduler entity 4 is provided for adapting load on a fronthaul network in a radio access network 1 comprising a central baseband unit 2 and a remote radio unit 3. The central baseband unit 2 and the remote radio unit 3 are interconnected by the fronthaul network 5 over which baseband signal information is exchanged.

The scheduler entity 4 comprises a first module 81 for obtaining information related to capacity of the fronthaul network. The first module 81 may, for instance, comprise receiving circuitry for obtaining by receiving the information from another entity. As another example, the first module 81 may comprise processing circuitry adapted to obtain the information related to capacity of fronthaul network.

The scheduler entity 4 comprises a second module 82 for adapting, based on the obtained information, air interface performance for at least one type of conveyed baseband signal information such as to enable adapting of load on the fronthaul network. The second module 82 may, for instance, comprise processing circuitry adapted such as to adapt the air interface performance, e.g. processing circuitry receiving input values, processing these, and outputting as result a value related to the air interface performance.

It is noted that one or both of the modules 81, 82 may be replaced by units.

Figure 10:
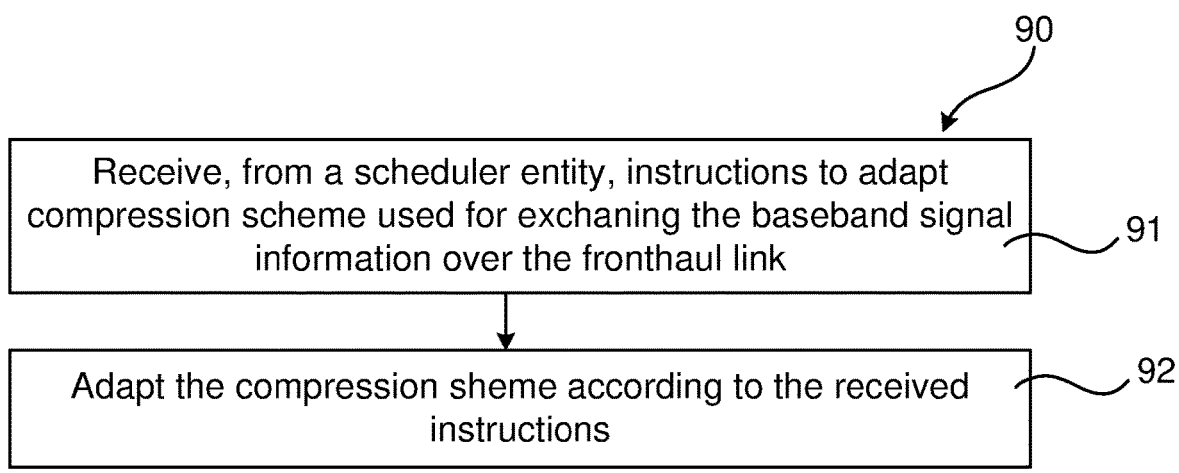
FIG. 10 illustrates a flow chart over steps of an embodiment of a method in a fronthaul module in accordance with the present teachings.

FIG. 10 illustrates a flow chart over steps of an embodiment of a method in a fronthaul module in accordance with the present teachings. A method 90 is provided, which may be performed in a first fronthaul module 2, 3 in a radio access network 1. The first fronthaul module 2, 3 is interconnected with a second fronthaul module 3, 2 by a fronthaul network 5 over which baseband signal information is exchanged.

The method 90 comprises receiving 91, from a scheduler entity 4, instructions to adapt compression scheme used for exchanging the baseband signal information over the fronthaul network 5.

The method 90 comprises adapting 92, the compression scheme according to the received instructions.

In an embodiment, the adapting 92 comprises adapting the current compression settings such as to increase or decrease compression ratio.

Figure 11:
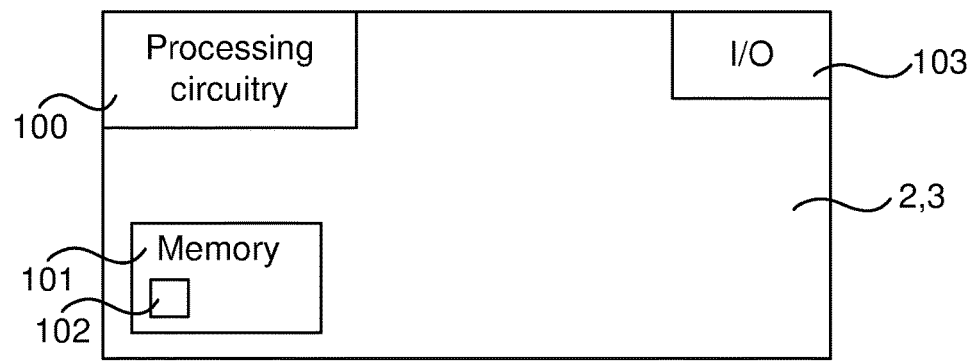
FIG. 11 illustrates schematically a fronthaul module and means for implementing embodiments of the method in accordance with the present teachings.

FIG. 11 illustrates schematically a first fronthaul module and means for implementing embodiments of the method in accordance with the present teachings. The first fronthaul module 2, 3 may, but need not, be a standalone entity and comprises processing circuitry 100, which may be any combination of one or more of a suitable central processing unit (CPU), multiprocessor, microcontroller, digital signal processor (DSP), etc., capable of executing software instructions stored in a computer program product 101, e.g. in the form of a storage medium 101. The processing circuitry 100 may further be provided as at least one application specific integrated circuit (ASIC), or field programmable gate array (FPGA).

The processing circuitry 100 is configured to cause the fronthaul module 2, 3 to perform a set of operations, or steps, e.g. as described in relation to FIG. 10. For example, the storage medium 101 may store the set of operations, and the processing circuitry 100 may be configured to retrieve the set of operations from the storage medium 101 to cause the fronthaul module 2, 3 to perform the set of operations. The set of operations may be provided as a set of executable instructions. The processing circuitry 100 is thereby arranged to execute methods as disclosed herein.

The storage medium 101 may also comprise persistent storage, which, for example, can be any single one or combination of magnetic memory, optical memory, solid state memory or even remotely mounted memory.

The first fronthaul module 2, 3 also comprises an input/output device 103 for communicating with other entities and devices. The input/output device 103 may be an interface and may, for instance, comprise a protocol stack, for communication with other devices or entities. The input/output device 103 may be used for receiving data input and for outputting data.

A first fronthaul module 2, 3 in a radio access network 1 is provided. The first fronthaul module 2, 3 may be the central unit 2 or the remote unit 3, which have been described e.g. in relation to FIG. 1. The first fronthaul module 2, 3 is interconnected with a second fronthaul module 3, 2 by a fronthaul network 5 over which baseband signal information is exchanged. The first fronthaul module 2, 3 is configured to:

receive, from a scheduler entity 4, instructions to adapt compression scheme used for exchanging the baseband signal information over the fronthaul network 5, and adapt, the compression scheme according to the received instructions.

The first fronthaul module 2, 3 may be configured to perform the above steps e.g. by comprising processing circuitry 100 and memory 101, the memory 101 containing instructions executable by the processing circuitry 100, whereby the first fronthaul module 2, 3 is operative to perform the steps. That is, in an embodiment, a first fronthaul module 2, 3 is provided. The first fronthaul module 2, 3 comprises processing circuitry 100 and memory 101, the memory 101 containing instructions executable by the processing circuitry 100, whereby first fronthaul module 2, 3 is operative to: receive, from a scheduler entity 4, instructions to adapt compression scheme used for exchanging the baseband signal information over the fronthaul network 5, and adapt, the compression scheme according to the received instructions.

In an embodiment, the first fronthaul module 2, 3 is configured to adapt by adapting the current compression settings such as to increase or decrease compression ratio.

Figure 12:
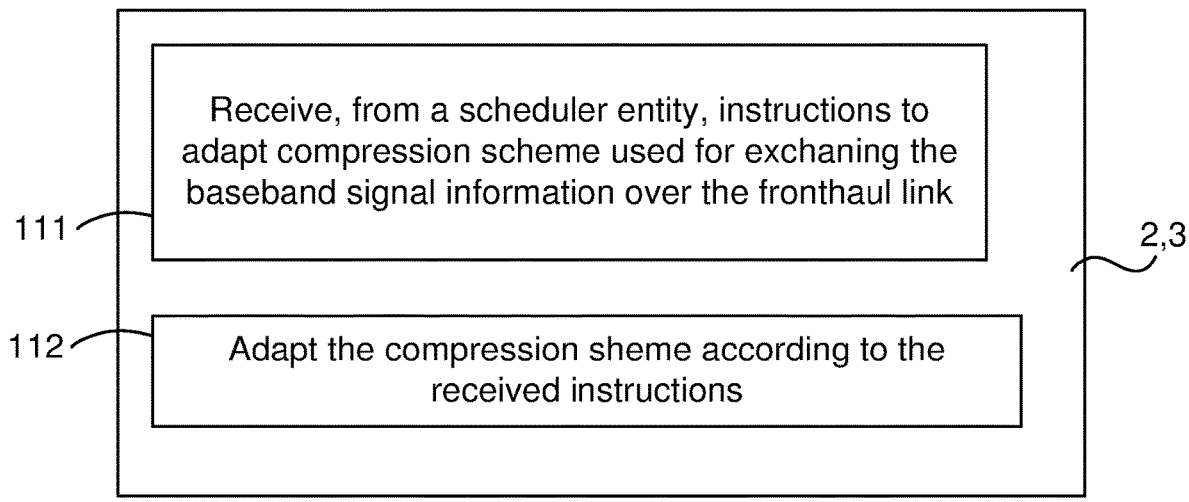
FIG. 12 illustrates a fronthaul module comprising function modules/software modules for implementing embodiments of the present teachings.

FIG. 12 illustrates a fronthaul module comprising function modules/software modules for implementing embodiments of the present teachings. The function modules can be implemented using software instructions such as computer program executing in a processor and/or using hardware, such as application specific integrated circuits (ASICs), field programmable gate arrays, discrete logical components etc., and any combination thereof. Processing circuitry may be provided, which may be adaptable and in particular adapted to perform any of the steps of the method 60 that has been described in various embodiments.

A first fronthaul module 2, 3 is provided for use in a radio access network 1 comprising a central baseband unit 2 and a remote radio unit 3. The central baseband unit 2 and the remote radio unit 3 are interconnected by the fronthaul network 5 over which baseband signal information is exchanged.

The first fronthaul module 2, 3 comprises a first module 111 for receiving, from a scheduler entity, instructions to adapt compression scheme used for exchanging the baseband signal information over the fronthaul network. The first module 111 may, for instance, comprise receiving circuitry.

The first fronthaul module 2, 3 comprises a second module 112 for adapting the compression scheme according to the received instructions. The second module 112 may, for instance, comprise processing circuitry adapted such as to adapt compression scheme according to the received instructions.

It is noted that one or both of the modules 111, 112 may be replaced by units.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A method performed in a scheduler entity for adapting load on a fronthaul network in a radio access network comprising a central baseband unit and a remote radio unit, the central baseband unit and the remote radio unit being interconnected by the fronthaul network over which baseband signal information is exchanged, the method comprising:
    obtaining information related to capacity of the fronthaul network; and
    adapting, based on the obtained information, air interface performance for at least one type of conveyed baseband signal information such as to enable adapting of load on the fronthaul network, wherein the adapting comprises using a compression algorithm model providing obtainable compression of the baseband signal information for different modulation orders, wherein the obtainable compression fulfills an air interface performance criterion.

2. The method in of claim 1, comprising, prior to the adapting, performing a preliminary allocation of radio resources to one or more communication devices and comprising, after the adapting, modifying the preliminary allocation of radio resources according to the adapted air interface performance.

3. The method in of claim 1, comprising allocating radio resources to one or more communication devices based at least on the adapted air interface performance.

4. The method of claim 1, comprising instructing the remote radio unit and the central baseband unit to increase compression ratio, thus reducing the load on the fronthaul network.

5. The method of claim 1, wherein the adapting comprises reducing the air interface performance by reducing a modulation and coding scheme for at least one communication device.

6. The method of claim 1, wherein the baseband signal information comprises time-domain samples and wherein the adapting the air interface performance comprises reducing modulation order for a communication device having a channel quality indicator fulfilling a threshold criterion, wherein the threshold criterion is based on a weighted average of the respective channel quality indicator for the communication device to be scheduled.

7. The method of claim 6, wherein weights for the communication device is based on one or both of: number of resource blocks per used radio frame and quality of service for the communication device.

8. The method of claim 1, wherein the baseband signal information comprises frequency-domain samples and wherein the adapting the air interface performance comprises reducing maximum modulation order of a modulation scheme based on quality of service per communication device and the adapting of load on the fronthaul network comprises instructing the remote radio unit and the central baseband unit to adapt compression ratio of data per communication device.

9. The method of claim 1, wherein the information related to the fronthaul network comprises one or more of: fronthaul load, throughput limitations, transmit buffer usage of a fronthaul module, receive buffer usage of a fronthaul module, congestion indicator and congestion alarm.

10. A scheduler entity for adapting load on a fronthaul network in a radio access network comprising a central baseband unit and a remote radio unit, the central baseband unit and the remote radio unit being interconnected by the fronthaul network over which baseband signal information is exchanged, the scheduler entity being configured to:
    obtain information related to capacity of the fronthaul network; and
    adapt, based on the obtained information, air interface performance for at least one type of conveyed baseband signal information such as to enable adapting of load on the fronthaul network, wherein the adapting comprises using a compression algorithm model providing obtainable compression of the baseband signal information for different modulation orders, wherein the obtainable compression fulfills an air interface performance criterion.

11. The scheduler entity of claim 10, configured to adapt by using a compression algorithm model providing obtainable compression of the baseband signal information for different modulation orders, wherein the obtainable compression fulfills an air interface performance criterion.

12. The scheduler entity of claim 10, configured to, prior to the adapting, perform a preliminary allocation of radio resources to one or more communication devices and configured to, after the adapting, modify the preliminary allocation of radio resources according to the adapted air interface performance.

13. The scheduler entity of claim 10, configured to allocate radio resources to one or more communication devices based at least on the adapted air interface performance.

14. The scheduler entity of claim 10, configured to instruct the remote radio unit and the central baseband unit to increase compression ratio, thus reducing the load on the fronthaul network.

15. The scheduler entity of claim 10, wherein the baseband signal information comprises time-domain samples and the scheduler entity being configured to adapt the air interface performance by reducing modulation order for a communication device having a channel quality indicator fulfilling a threshold criterion, wherein the threshold criterion is based on a weighted average of the respective channel quality indicator for the communication device to be scheduled, the weights for the communication device being based on one or both of: number of resource blocks per used radio frame and quality of service for the communication device.

16. The scheduler entity of claim 10, wherein the baseband signal information comprises frequency-domain samples and the scheduler entity is configured to adapt the air interface performance by reducing maximum modulation order of a modulation scheme based on quality of service per communication device of one or more communication devices and to adapt load on the fronthaul network by instructing the remote radio unit and the central baseband unit to adapt compression ratio of data per communication device.

17. The scheduler entity of claim 10, wherein the information related to the fronthaul network comprises one or more of: fronthaul load, throughput limitations, transmit buffer usage of a fronthaul module, receive buffer usage of a fronthaul module, congestion indicator and congestion alarm.

18. A method performed in a first fronthaul module in a radio access network, the first fronthaul module being interconnected with a second fronthaul module by a fronthaul network over which baseband signal information is exchanged, the method comprising:
   receiving, from a scheduler entity, instructions to adapt compression scheme used for exchanging the baseband signal information over the fronthaul network; and
   adapting, the compression scheme according to the received instructions, wherein the adapting comprises using a compression algorithm model providing obtainable compression of the baseband signal information for different modulation orders, wherein the obtainable compression fulfills an air interface performance criterion.

19. The method of claim 18, wherein the adapting comprises adapting the current compression settings such as to increase or decrease compression ratio.

\* \* \* \* \*

UNITED STATES PATENT AND TRADEMARK OFFICE
CERTIFICATE OF CORRECTION

PATENT NO. : 11,063,795 B2
APPLICATION NO. : 16/461264
DATED : July 13, 2021
INVENTOR(S) : Cavalcante et al.

It is certified that error appears in the above-identified patent and that said Letters Patent is hereby corrected as shown below:

On the Title Page

Item (56), under "OTHER PUBLICATIONS", in Column 2, Line 14, delete "Networks(WOWMOM)," and insert -- Networks (WOWMOM), --, therefor.

In the Drawings

In Fig. 10, sheet 6 of 7, for Step "91", in Line 2, delete "exchaning" and insert -- exchanging --, therefor.

In Fig. 12, sheet 7 of 7, for Step "111", in Line 2, delete "exchaning" and insert -- exchanging --, therefor.

In the Specification

In Column 1, Line 6, delete "is" and insert -- is a --, therefor.

In the Claims

In Column 15, Line 45, in Claim 2, delete "in of" and insert -- of --, therefor.

In Column 15, Line 51, in Claim 3, delete "in of" and insert -- of --, therefor.

Signed and Sealed this
Twenty-fifth Day of January, 2022

Drew Hirshfeld
*Performing the Functions and Duties of the*
*Under Secretary of Commerce for Intellectual Property and*
*Director of the United States Patent and Trademark Office*